United States Patent
Bochen et al.

(10) Patent No.: US 9,930,165 B2
(45) Date of Patent: Mar. 27, 2018

(54) ADJUSTING SYSTEM FOR ADJUSTING A COMPONENT OF A MOTOR VEHICLE ON AN ADJUSTMENT PATH

(71) Applicants: Marian Bochen, Eitelborn (DE); Axel Knopp, Eitelborn (DE); Henri Becker, Rhens (DE)

(72) Inventors: Marian Bochen, Eitelborn (DE); Axel Knopp, Eitelborn (DE); Henri Becker, Rhens (DE)

(73) Assignee: Stabilus GmbH, Koblenz (DE)

( * ) Notice: Subject to any disclaimer, the term of this patent is extended or adjusted under 35 U.S.C. 154(b) by 165 days.

(21) Appl. No.: 14/830,540

(22) Filed: Aug. 19, 2015

(65) Prior Publication Data

US 2016/0057273 A1    Feb. 25, 2016

(30) Foreign Application Priority Data

Aug. 20, 2014 (DE) ......................... 10 2014 111 921

(51) Int. Cl.
*H04M 1/725* (2006.01)
*H04L 29/08* (2006.01)

(52) U.S. Cl.
CPC ...... *H04M 1/72533* (2013.01); *H04L 67/125* (2013.01)

(58) Field of Classification Search
CPC ..... H04W 4/046; H04W 88/02; H04W 4/005; H04L 67/12
See application file for complete search history.

(56) References Cited

U.S. PATENT DOCUMENTS

| 2007/0114960 A1 | 5/2007 | Hillen |
| 2008/0027589 A1* | 1/2008 | Hiwano ............... E05F 15/689 |
| | | 701/2 |

(Continued)

FOREIGN PATENT DOCUMENTS

| CN | 1970984 | 5/2007 |
| CN | 101006244 | 7/2007 |

(Continued)

OTHER PUBLICATIONS

Office Action dated Aug. 16, 2016 which issued in the corresponding Japanese Patent Application No. 2015-161570.

(Continued)

*Primary Examiner* — Dung Hong
(74) *Attorney, Agent, or Firm* — Cozen O'Connor

(57) ABSTRACT

An adjusting system for adjusting a component of a motor vehicle on an adjustment path between a basic position and an end position with a mobile communications device through which control commands can be sent wirelessly to a control unit arranged in the motor vehicle and through which a drive for the adjustment of the adjustable component can be actuated. A target position selected from a plurality of target positions on the adjustment path of the adjustable component can be entered in the mobile communications device, and thereupon a corresponding actuating signal can be sent to the control unit wirelessly through the mobile communications device. The drive for adjusting the adjustable component to the selected target position can be actuated by the control unit.

15 Claims, 2 Drawing Sheets

(56) References Cited

U.S. PATENT DOCUMENTS

| | | | | |
|---|---|---|---|---|
| 2008/0039998 | A1* | 2/2008 | Fein | B60R 16/037 |
| | | | | 701/36 |
| 2010/0031157 | A1* | 2/2010 | Neer | G06Q 10/06 |
| | | | | 715/738 |
| 2010/0076651 | A1* | 3/2010 | Nakakura | E05C 17/00 |
| | | | | 701/49 |
| 2012/0137803 | A1* | 6/2012 | Bochen | F16H 25/2015 |
| | | | | 74/89.32 |
| 2015/0283886 | A1* | 10/2015 | Nania | E05F 15/73 |
| | | | | 296/146.4 |

FOREIGN PATENT DOCUMENTS

| | | |
|---|---|---|
| GB | 2418741 | 4/2006 |
| JP | 2002-295086 | 10/2002 |
| JP | 2003-104055 | 4/2003 |
| JP | 2005-014840 | 1/2005 |
| JP | 2006-104665 | 4/2006 |
| JP | 2013-049952 | 3/2013 |
| JP | 2013049952 A * | 3/2013 |

OTHER PUBLICATIONS

Office Action dated Sep. 13, 2016 which issued in the corresponding Chinese Patent Application No. 201504979311.

* cited by examiner

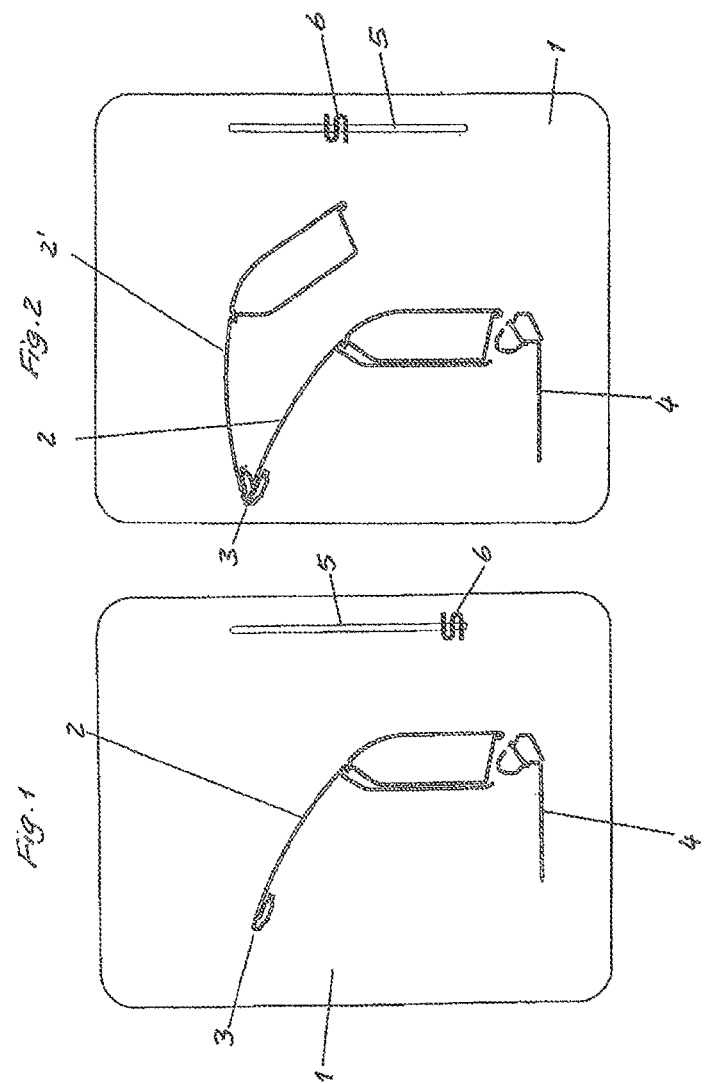

ADJUSTING SYSTEM FOR ADJUSTING A COMPONENT OF A MOTOR VEHICLE ON AN ADJUSTMENT PATH

BACKGROUND OF THE INVENTION

1. Field of the Invention

The invention is directed to an adjusting system for adjusting a component of a motor vehicle on an adjustment path between a basic position and an end position with a mobile communications device through which control commands can be sent wirelessly to a control unit arranged in the motor vehicle and through which a drive for the adjustment of the adjustable component can be actuated.

2. Description of the Related Art

Known adjusting systems of the type mentioned above for adjusting a component of a motor vehicle on an adjustment path make it possible to actuate an adjustable component to move from a basic position into an end position, and vice versa, using a mobile communications device that is commonly used for other purposes. It is also possible to pause the movement in an intermediate position during a movement drive, but this requires an additional actuation of the mobile communications device. The mobile communications device can be a smartphone, a tablet PC, or a smartwatch, for example.

SUMMARY OF THE INVENTION

It is an object of the invention to provide an adjusting system of the type mentioned above for adjusting a component of a motor vehicle on an adjustment path having greater ease of use.

This object is met according to one embodiment of the invention in that a target position selected from a plurality of target positions on the adjustment path of the adjustable component can be entered in the mobile communications device, whereupon a corresponding actuating signal can be sent to the control unit wirelessly through the mobile communications device, wherein the drive for adjusting the adjustable component to the selected target position can be actuated by the control unit.

This construction also makes it possible to move to specific intermediate positions, as target positions, between the basic position and the end position, without requiring a stop command in that the desired intermediate position is entered directly as selected target position. The drive then stops in this selected intermediate position. By subsequently entering a further target position or the basic position or end position, the adjustable component can then be moved to this further position.

The adjustable component can be of a diverse type, e.g., a garage door, a window, or any type of hatch.

In an advantageous construction, the adjustable component can be a hatch of the motor vehicle.

A particularly suitable drive is an electric motor drive. The drive can have a spindle drive that is drivable by an electric motor and through which the hatch can be movably driven to the selected target position.

The selected target position can be a position from a plurality of selectable target positions.

An extensive freedom of selection is afforded in a particularly convenient manner when the selected target position on the adjustment path can be entered steplessly for the adjustable component and the adjustable component can be movably driven steplessly to the selected target position.

A particularly simple type of operation for selecting a target position is that the selected target position can be entered in the mobile communications device through voice input.

However, it is also possible to enter the selected target position in the mobile communications device through key input on a keypad or through touch input on a touch-sensitive input surface.

In case of touch input on a touch-sensitive input surface, the selected target position can be entered in a simple manner in that the input surface has a display on which the adjustment path of the adjustable component is displayed, and a touch-sensitive input zone or keypad is associated with this display.

When the touch-sensitive input zone or keypad is formed by a bar graph or the adjustable component can be displayed on the display in the current starting position and/or selected target position of the adjustable component, the operator can also visually and, therefore, quickly detect and actuate the input position to be actuated.

It is possible to visually follow the movement of the adjustable component without directly viewing the adjustable component when the movement of the adjustable component from its current starting position into its selected target position can be displayed on the display.

When the operator has no visual contact with the adjustable component when actuating the selected target position, the operator can nevertheless follow its adjustment movement on the display.

To facilitate selection and input of the target position, the touch-sensitive input zone or keypad can extend on the display along the adjustment path of the adjustable component.

If a determined intermediate position is to be stored and retrievable for a longer period of time, a permanently stored target position can be stored in the communications device and can be retrieved by the control unit to actuate the drive for adjusting the adjustable component to the stored target position. This is advantageous, for example, when the adjustable component is a rear hatch of a motor vehicle which is parked in a garage having a height lower than the end position of the opened rear hatch. A position of the rear hatch with a lower height than the height of the garage would then be stored as permanent target position so that when opening the rear hatch the rear hatch does not hit the ceiling of the garage.

To alert the operator that the selected target position has been reached, particularly in the absence of visual contact with the adjustable component, a visual signal or acoustic signal can be sent by the mobile communications device when the selected target position of the adjustable component has been reached.

If an obstacle is located in the movement path of the adjustable component, the position of an obstacle in the adjustment path of the adjustable component can be detected by an obstacle sensor, and a corresponding obstacle position signal can be sent to the mobile communications device, and the detected position of the obstacle can then be entered in the mobile communications device as new selected target position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment example of the invention is shown in the drawings and will be described in more detail in the following. The drawings show:

FIG. 1 is a display of a tablet PC with a hatch shown in basic position;

FIG. 2 is a display according to FIG. 1 with the hatch shown in an intermediate position.

DETAILED DESCRIPTION OF THE PRESENTLY PREFERRED EMBODIMENTS

Figure 3:
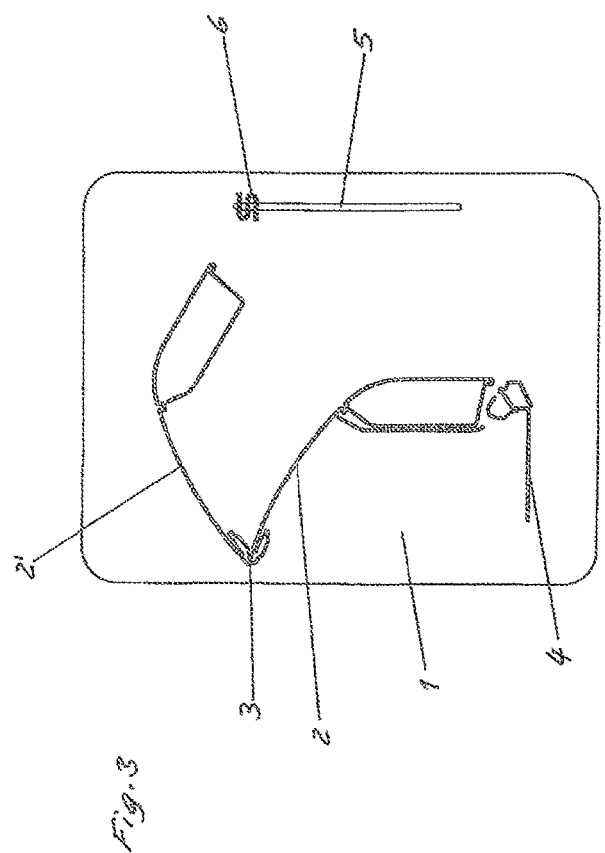
FIG. 3 is the display according to FIG. 1 with the hatch shown in an end position.

The depicted display 1 of a tablet PC shows a rear area of a motor vehicle with a hatch 2. The hatch 2 is mounted at the body 4 of the motor vehicle so as to be swivelable around a horizontal swiveling axis 3 at the upper end of the hatch 2 and is oriented substantially downward in its closed basic position (FIG. 1).

In addition to the hatch 2 in basic position, FIG. 2 also shows the hatch 2' in an intermediate position, and in addition to the hatch 2 in the basic position, FIG. 3 also shows the hatch 2' in a fully opened end position.

In addition to the depiction of the end of the motor vehicle and the hatch 2, 2', a vertical bar graph is also shown. The length of this bar graph forms a touch-sensitive input zone 5.

The hatch 2' is always shown in the display 1 in the target position that is selected by an operator and entered by touching the path of the input zone 5 at the appropriate point. This position is also indicated along the input zone 5 by a position symbol 6.

If the operator wants to adjust the current position of the hatch 2 to a new selected target position, the operator touches the input zone 5 along the length thereof at the point corresponding to this new selected target position, and the hatch 2' in this target position and the position symbol are immediately indicated at the touched location along the input zone 5.

Alternatively, the movement of the hatch 2 on the movement path from the starting position to the new selected target position can also be displayed first and, after that, the permanent display of the hatch 2' in the new selected target position can be shown.

When a new selected target position has been entered in this way, corresponding control commands are sent wirelessly from the tablet PC to a control unit, not shown, in a motor vehicle, which control unit in turn actuates a drive for adjusting the hatch into the new selected target position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An adjusting system comprising
a mobile communications device;
a control unit which is arranged in a motor vehicle;
an adjustable component of a motor vehicle that is adjustable on an adjustment path between a basic position and an end position with the mobile communications device through which control commands can be sent wirelessly to the control unit and through which a drive for the adjustment of the adjustable component can be actuated,
wherein a target position selected from a plurality of target positions on the adjustment path of the adjustable component can be entered in the mobile communications device and a corresponding actuating signal can be sent to the control unit wirelessly through the mobile communications device, and
wherein the drive that adjusts the adjustable component to the selected target position is configured to be actuated by the control unit,
wherein a position of an obstacle in the adjustment path of the adjustable component is detected by an obstacle sensor, and a corresponding obstacle position signal is sent to the mobile communications device, and the detected position of the obstacle is entered in the mobile communications device as new selected target position.

2. The adjusting system according to claim 1, wherein the adjustable component is a hatch of the motor vehicle.

3. The adjusting system according to claim 2, wherein the drive is an electric motor drive.

4. The adjusting system according to claim 3, wherein the drive has a spindle drive driven by an electric motor and by which the hatch is movably driven to the selected target position.

5. The adjusting system according to claim 1, wherein the selected target position on the adjustment path is entered steplessly for the adjustable component and the adjustable component is movably driven steplessly to the selected target position.

6. The adjusting system according to claim 1, wherein the selected target position is entered in the mobile communications device via voice input.

7. The adjusting system according to claim 1, wherein the selected target position is entered in the mobile communications device via a key input on a keypad.

8. The adjusting system according to claim 1, wherein the selected target position is entered in the mobile communications device via a touch input on a touch-sensitive input surface.

9. The adjusting system according to claim 8, wherein the input surface has a display on which the adjustment path of the adjustable component is displayed, and one of a touch-sensitive input zone and a keypad associated with this display.

10. The adjusting system according to claim 9, wherein the one of the touch-sensitive input zone and the keypad forms a bar graph.

11. The adjusting system according to claim 9, wherein the adjustable component can be displayed on the display in a current starting position and/or the selected target position of the adjustable component.

12. The adjusting system according to claim 11, wherein the at least one of the touch-sensitive input zone and the keypad extends on the display along the adjustment path of the adjustable component.

13. The adjusting system according to claim 9, wherein the movement of the adjustable component from a current starting position into the selected target position is displayed on the display.

14. The adjusting system according to claim 1, wherein a permanently stored target position can be stored in the mobile communications device and can be retrieved by the control unit to actuate the drive for adjusting the adjustable component to the stored target position.

15. The adjusting system according to claim 14, wherein at least one of a visual signal and an acoustic signal is sent by the mobile communications device when the selected target position of the adjustable component has been reached.

* * * * *